United States Patent [19]

Smith

[11] Patent Number: 4,985,762

[45] Date of Patent: Jan. 15, 1991

[54] PANORAMIC INTERACTIVE SYSTEM

[75] Inventor: Graham T. Smith, Toronto, Canada

[73] Assignee: Horisonscan Inc., Toronto, Canada

[21] Appl. No.: 448,263

[22] Filed: Dec. 11, 1989

[30] Foreign Application Priority Data

Dec. 14, 1988 [GB] United Kingdom ................. 8829135

[51] Int. Cl.$^5$ .............................................. H04N 5/76
[52] U.S. Cl. ........................................ 358/87; 354/94; 358/335
[58] Field of Search ..................... 358/87, 335; 354/95, 354/94, 96, 98, 99

[56] References Cited

U.S. PATENT DOCUMENTS

| | | |
|---|---|---|
| 3,240,113 | 3/1966 | Stechemesser . |
| 4,125,862 | 11/1978 | Catano ................................... 358/87 |
| 4,868,682 | 9/1989 | Shimizu .................................. 358/87 |

*Primary Examiner*—Howard W. Britton

[57] ABSTRACT

This invention relates to a method and apparatus for recording of a panorama or large portion thereof in a manner for display or selective display of a portion thereof on a video display device. The method initially records the panorama in a manner not suitable for video display and thereafter projects the recorded image and records the projection of the panorama in a manner suitable for selective reproduction on a video display device. The method and apparatus are particularly suitable for recording of real time panoramas where the initial recording is time dependent and occurs quickly with sufficient accuracy for effective recording of the panorama, allowing the projecting step and second recording step to be independent of the initial demanding time restraint. Staging the recording of the panorama simplifies the recording and allow specialization of the steps to improve the quality of the final reproduction. The apparatus includes a panoramic lens in combination with a camera arrangement for producing an initial record of the panorama. A projecting arrangement produces an image of the panorama recorded on record, which image is recorded by a recording device in a manner suitable for video display.

17 Claims, 9 Drawing Sheets

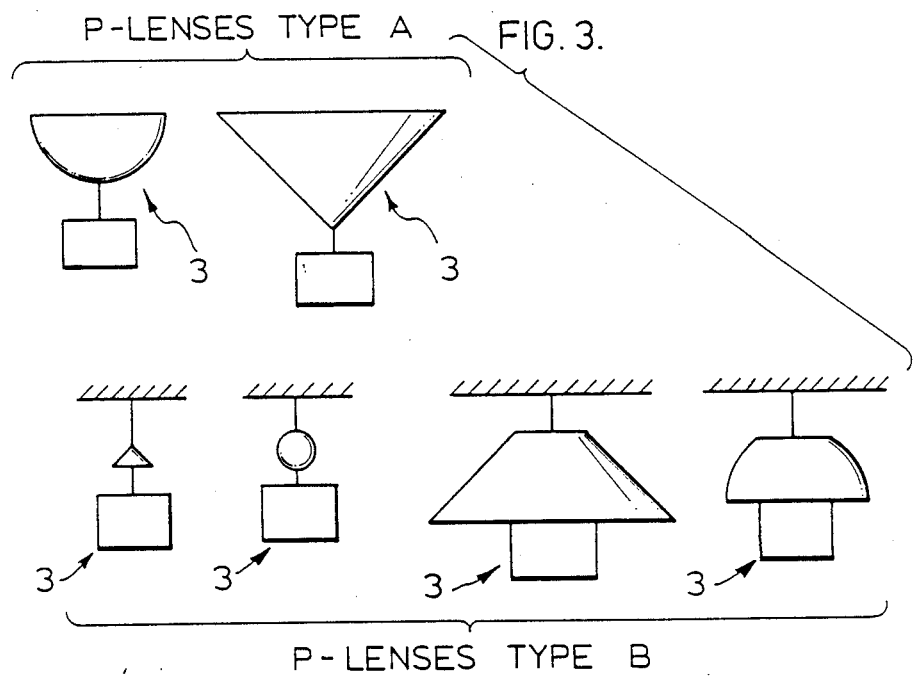
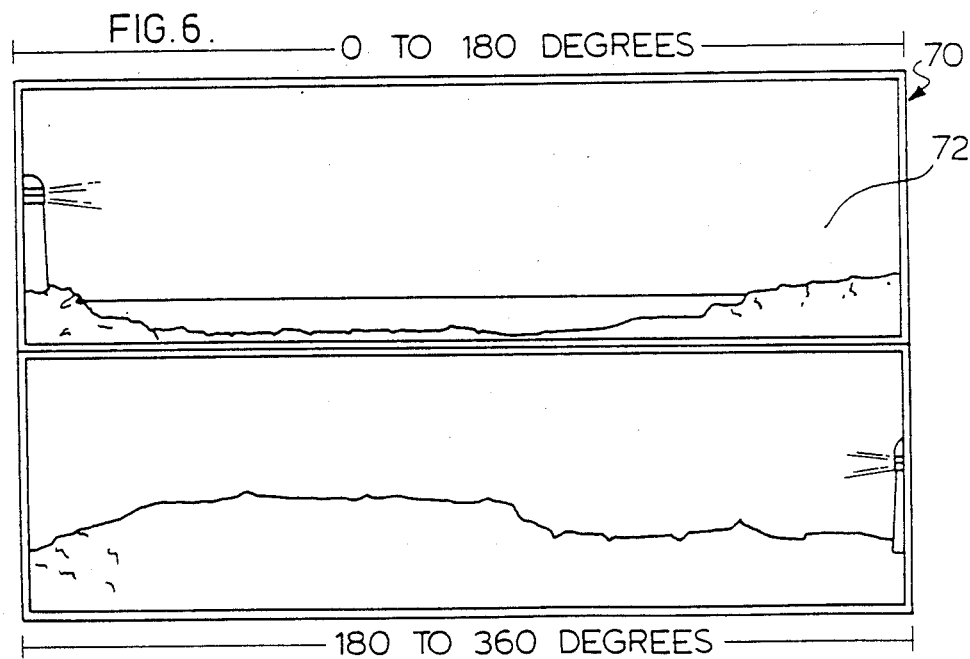

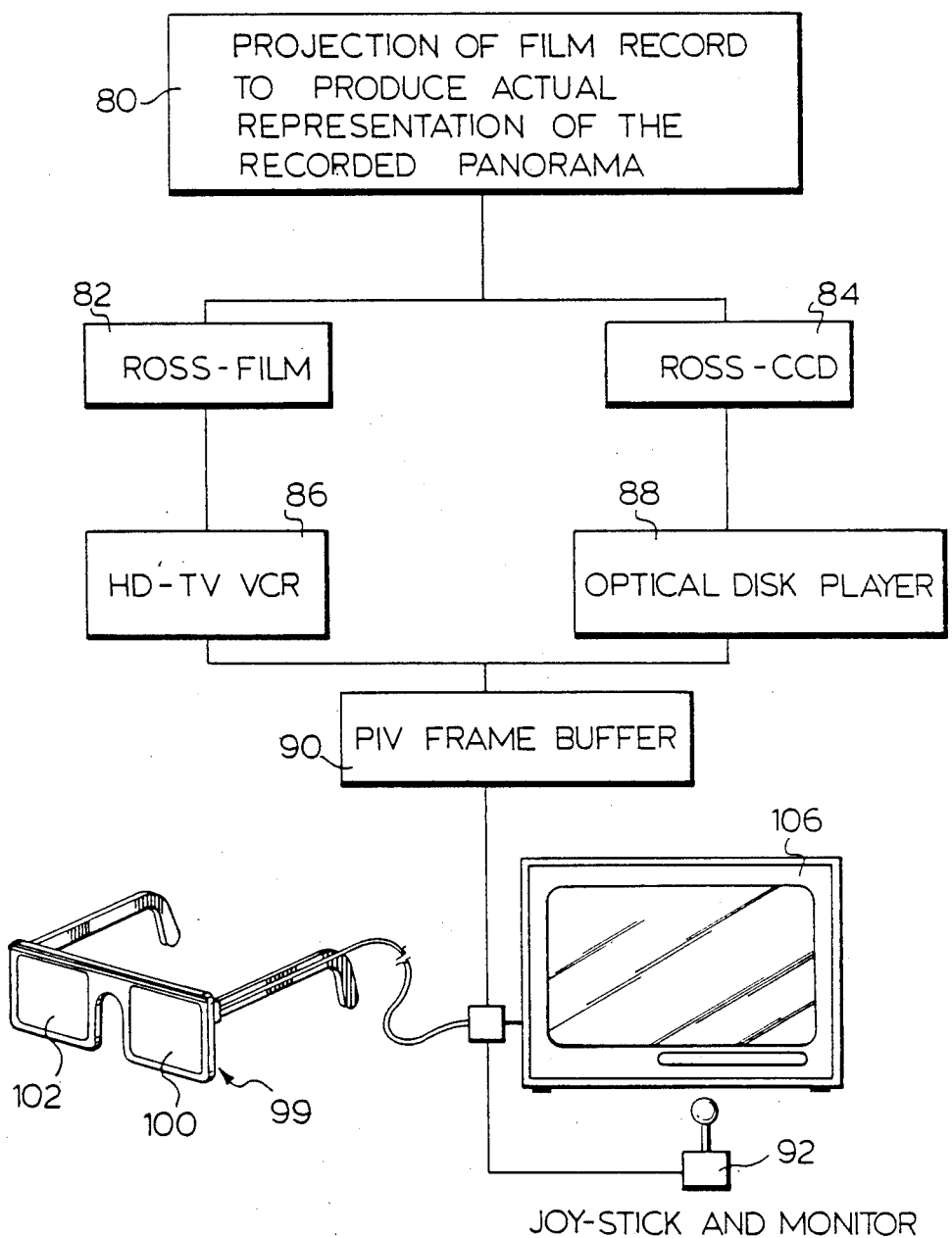

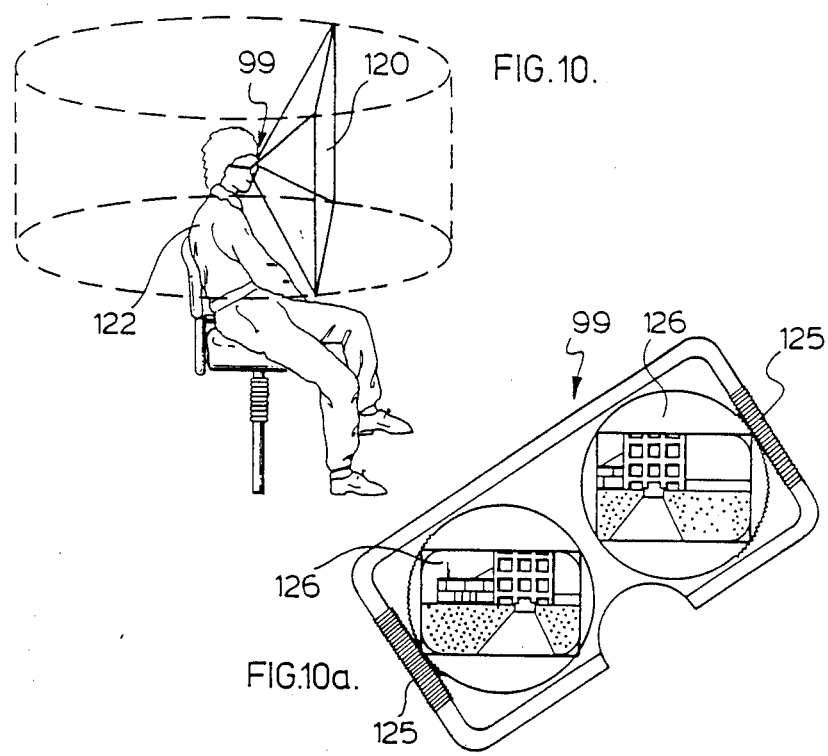
FIG. 10.
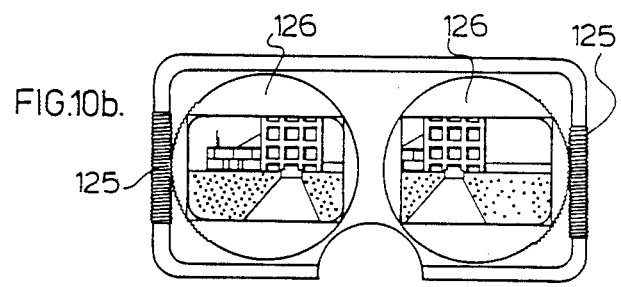
FIG.10a.
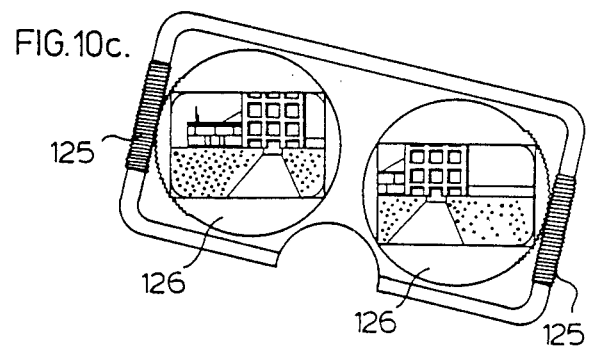
FIG.10b.
FIG.10c.

PANORAMIC INTERACTIVE SYSTEM

BACKGROUND OF THE INVENTION

Panoramic recording systems are known and have used moving imagers, fish-eye lenses, multiple cameras or panoramic lenses for recording of a panorama or a large portion thereof. Many of the known techniques are suitable for a still panorama, however, even in this case, changing light conditions or changes within the panorama can cause distortion and loss of accuracy.

The use of panoramic lenses or fish-eye lenses in recording of an image produce a distorted form of the image on a film record. The film record is basically a circular mapping of the panorama and are difficult to use in that format. It is known to take these film records and project them on a cylindrical screen for viewing. In the case of real time panoramic imaging, recording of the image in this particular form does provide good detail, but viewing in the circular form is not particularly satisfactory.

One example of a different method for recording a generally static panoramic image is disclosed in U.S. Pat. No. 4,125,862 which issued Nov. 14, 1978. This patent discloses a system where the panorama is scanned in a series of discreet segments and the information is recorded in a format suitable for use in displaying of portions of that panorama on a video display unit. The time interval to effectively scan the entire panorama renders this type of direct recording of the panorama only useful for generally static panoramas or ones in which real time imaging is not critical. With such a system, changing light conditions may also cause portions of the panorama to be less visible.

U.S. Pat. No. 3,240,113, which issued to Stechemesser et al Mar. 15, 1966, discloses a particular image gathering arrangement which utilizes panoramic lenses and results in recording of the panorama on a film record in a ring type shape. This patent also illustrates how the recorded images can be reprojected and shown on a cylindrical screen.

There remains a need to provide a simple method and apparatus for recording of a panorama in a record suitable for selective display on a video display device.

SUMMARY OF THE INVENTION

The present invention, in contrast to the prior art, utilizes a two stage process for converting a panorama into a conventional rectangular panorama record or other record suitable for a video display device. The method initially records the panorama in a known recording format and thereafter, without the time restraints of the initial recording, projects the records and records the projection in a form suitable for video display, such as a rectangular panoramic record.

According to an aspect of the invention, the two stage process utilizes the conventional techniques for recording of a panorama on a film record where the panorama is recorded generally in a donut type shape. The accuracy for recording the panorama in this type of format is generally well developed. The second stage of the method requires reprojecting of this recorded image to remove the distortion introduced in recording the image initially. This can be done by using the same type of arrangement that was used for collecting the image to project the image such that it could be displayed on a cylindrical screen. Thus, the distortion introduced due to the particular manner of recording is generally removed by the projecting step using a similar optic system. The projected recorded image is then recorded either directly or from a screen by means of a rotating optical slit scanner (Ross), or a slit charged coupled device (CCD). This recording in the second step converts the panorama into a conventional rectangular record which can be sampled and displayed or partially displayed on a video display device. Once the conversion has been made to the rectangular panorama record, the known technology for displaying of the image can be used in association with a video display device for viewing of the panorama.

The above method is advantageous with respect to still panoramas, in that the panorama may be recorded at a single point in time using well known technology which results in an accurate, but distorted record and thereafter, without any time restraints on the actual recording, a rectangular panorama record may be produced from the initial recorded image after it has been projected and the distortion of recording removed by the optical projection step. Such an arrangement provides additional time for the converting of the image into a rectangular panorama such that it can be completed accurately while the initial step is more suitable for the accurate recording of the panorama.

The method is particularly useful with respect to the real time recording of panorama images. The changing panorama may be recorded in the first stage of the method using the known conventional accurate techniques and thereafter the record with the timing sequence thereof converted into rectangular panorama records which require more time to produce, but which can be accomplished as it is merely the projection of a fixed record as opposed to the recording of a changing panorama. The timing of the real time panorama image initially recorded can be reintroduced into the rectangular panorama record after the conversion, such that a real time rectangular panorama record is produced having the accuracy generally corresponding with the first stage recording of the real time panorama.

BRIEF DESCRIPTION OF THE DRAWINGS

Preferred embodiments of the invention are shown in the drawings, wherein:

FIG. 3 is a schematic illustrating various types of panoramic lenses referred to as P-lenses, type A and type B;

FIG. 6 shows the preferred rectangular panorama record produced by the apparatus of FIG. 5;

FIG. 7 is a schematic illustrating the projection of the film record of the first stage of the invention and the subsequent recording thereof and eventual display on a video display device;

FIG. 10 is a representation of a viewer's field of view;

FIGS. 10a, 10b and 10c show certain displays on the screens of video glasses;

DETAILED DESCRIPTION OF THE PREFERRED EMBODIMENTS

The method and apparatus of the present invention convert a still panorama into a conventional rectangular panorama record suitable for use in selective display on a video display device. Such a conventional rectangular panorama record is known, as exemplified by U.S. Pat. No. 4,125,862. Such an arrangement has a user control which allows the user to select what portion of the rectangular panorama record that he wishes to have displayed on the video display device and for simulating moving within the panorama by adjusting the controls.

Figure 1:
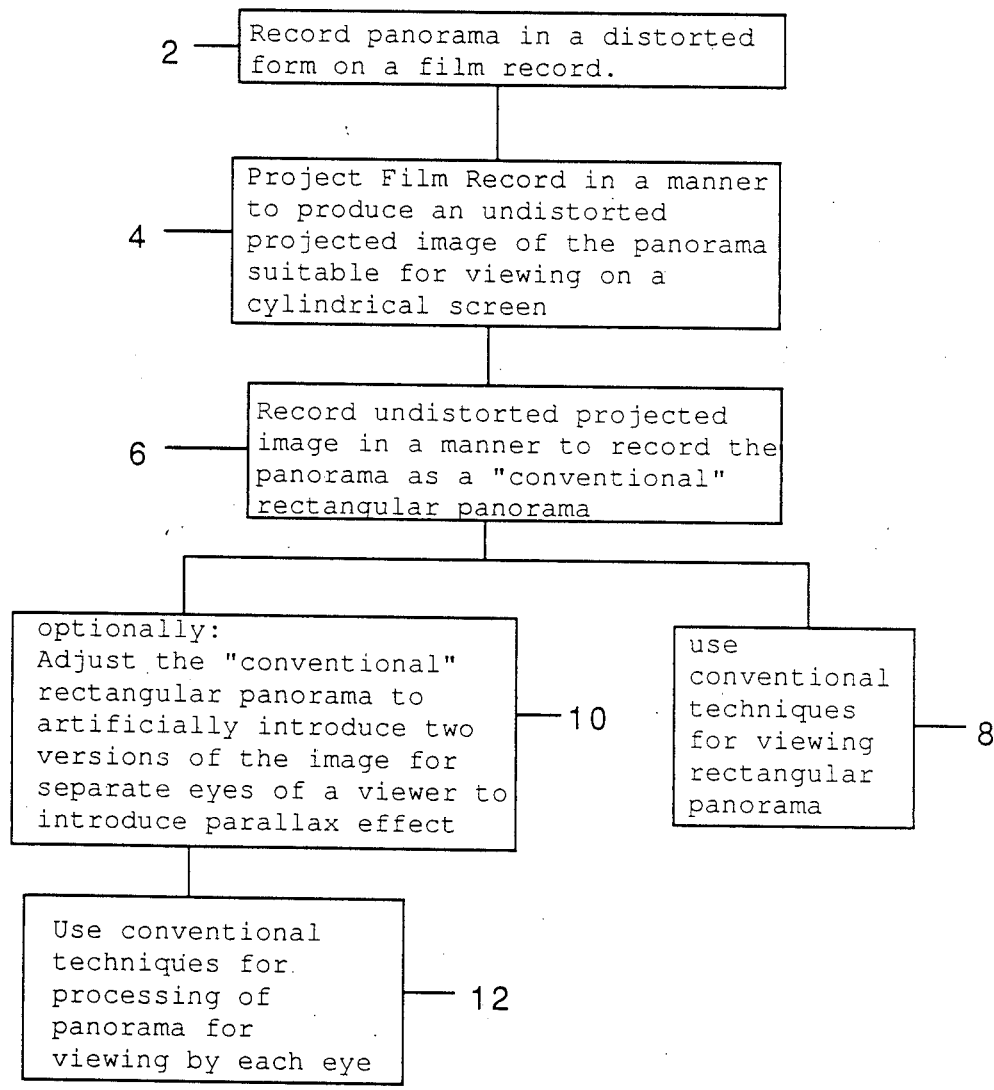
FIG. 1 is a flow chart showing the recording of a still panorama.
Figure 4:
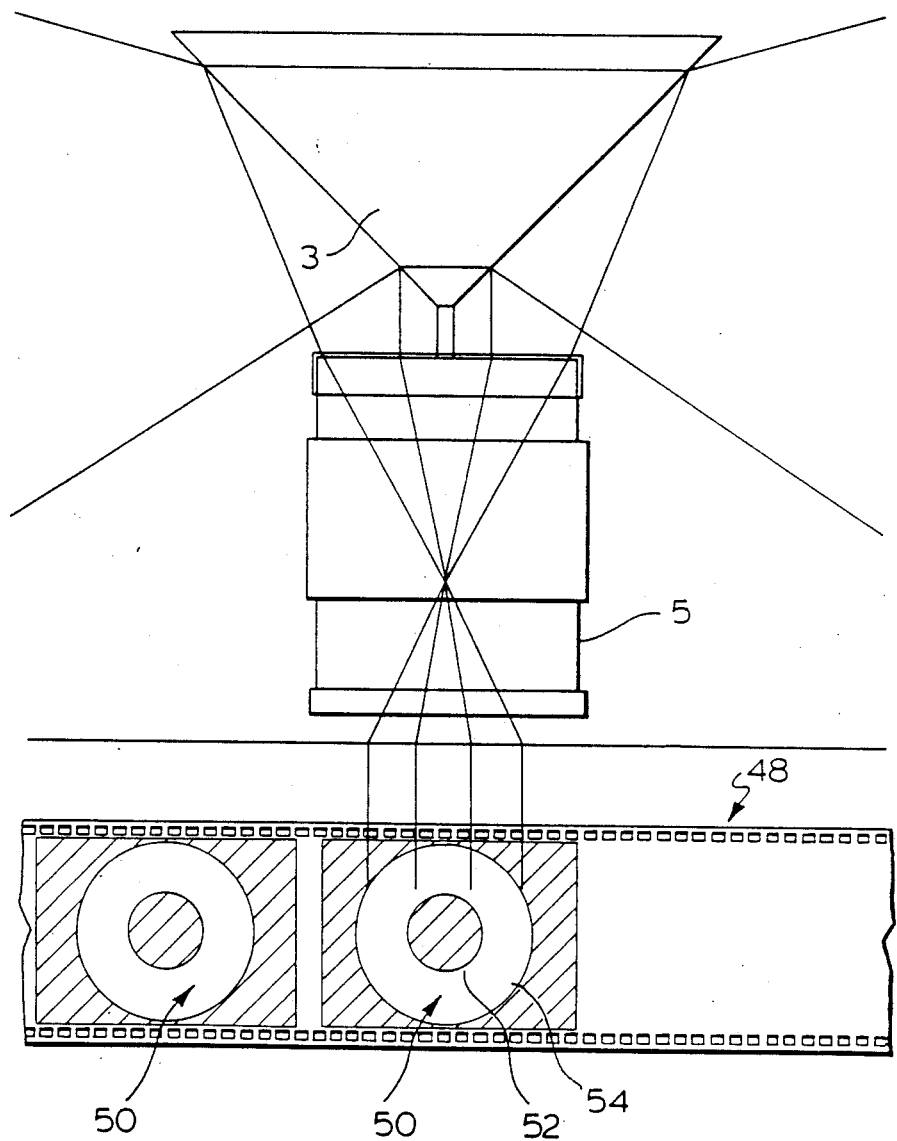
FIG. 4 is a schematic illustrating the recording of a panorama using a P-lens to produce the ring shaped initial film record.

The first step 2 of the method illustrated in FIG. 1 requires recording of the panorama in a distorted form preferably as a ring or portion thereof on a film record, resulting in a circular mapping. This recording is accomplished, for example, by using a P-lens 3 and a conventional camera arrangement 5 to produce a record 50 as generally shown at the bottom of FIG. 4. Each one of the ring shaped images 50 would represent the panorama at a single point in time or correspond to a still panorama. Each record 50 provides a distorted recording of the panorama and is generally difficult to directly use by individuals or effectively use by means of a video display device. What is normally done with this type of recording is to project the image as set out in the second step 4 of FIG. 1 which requires projecting the film record 50 in a manner to produce an undistorted projected image of the panorama suitable for viewing on a cylindrical screen.

Figure 5:
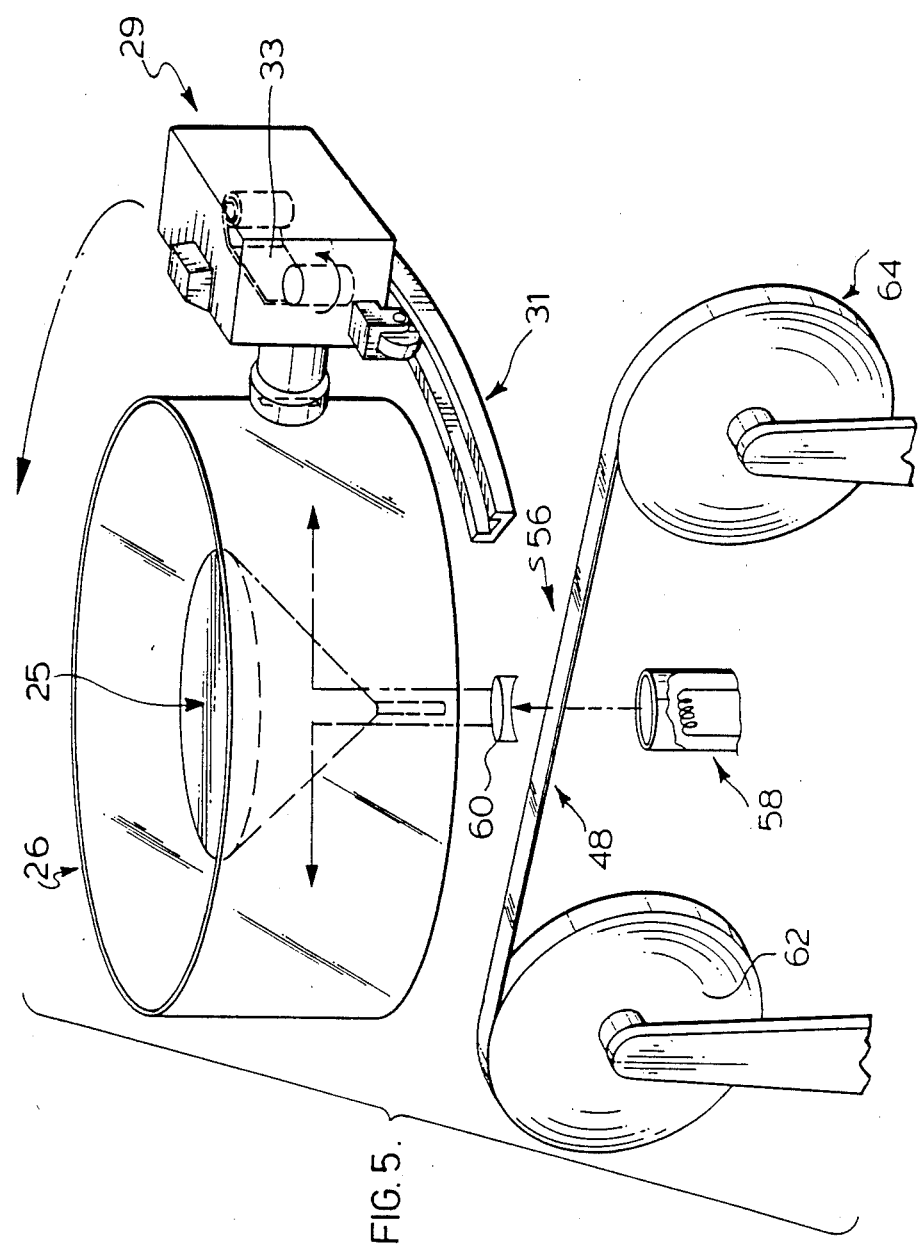
FIG. 5 is a partial perspective showing the projection of the film record of FIG. 4 and the subsequent recording of the projected record by means of a Ross.

The projection of the film record 50 is illustrated in FIG. 5 and, in this case, is shown for projecting of a series of film records 48 which would be used in conversion of a real time panorama. In the case of a still panorama, the film record 50 is merely projected generally using a similar optical system, as used in the recording, to remove the distortion and allow reproduction of the panorama on a cylindrical screen, labelled 26 in FIG. 5.

Panoramic lenses 3, as shown in FIG. 3, cause the image to be compressed at the narrow portion 52 and expanded at the wider portion 54, illustrated in record 50 of FIG. 4. This compression of the image makes it important to have a high resolution capability in the initial recording. The use of P-lenses 3 and high resolution film photography is particularly suitable, although the invention is not limited by this combination.

The high resolution is required to provide the accuracy in the projecting step 4 and determines to a large extent the accuracy of the recording step 6 of the projected image in the second stage of the method. The film records 50, in the form of a circular map shown at the bottom of FIG. 4, represent the entire panorama, with the innermost circular portion 52 representing the lower portion of the panorama scanned, and portion 54 representing the upper panorama scanned. The resolution required for recording of the lower portion of the panorama is higher due to the compression thereof. The degree of distortion and manner of distortion will vary with the type of panoramic lens 3 used or fish-eye lens.

The next step 6 in the method requires recording of the undistorted projected image in a manner to record the panorama as a rectangular panorama 70 shown in FIG. 6. This step 6 is shown in FIG. 5 where a camera 29 is rotated about the panoramic lens 25 for recording of the projected panoramic image. This then results in the panorama being converted to a rectangular panorama record which can use conventional techniques 8, as shown in FIG. 1, for viewing thereof.

In a preferred embodiment, as illustrated in FIG. 1, it is possible to further process the rectangular panorama record, or the subsequent display of that record, to adjust the rectangular panorama, as illustrated in step 10, to artificially introduce two version of the image for separate eyes of a viewer to introduce a synthetic parallax effect. This step increases the realism of the produced image and uses the video glasses 99 generally shown in FIG. 7. These video glasses have separate screens 100 and 102 associated with each lens of the glasses and thus the image reproduced on each screen by step 12 would be slightly different to introduce this desired effect.

The method, as generally set out in the first three steps of FIG. 1, allows for the accurate recording of the panorama, albeit in a distorted form, followed by the projection of this initial record to remove the distortion whereafter the projected image is then used for recording in a conventional rectangular panorama record. The first step 2 is considered a first stage of the method, whereas the second and third steps 4 and 6 are considered a second stage of the method.

The accuracy of the recording in the first step can be reproduced in the conventional rectangular panorama record. The time requirement for the first step is very short, whereas the time requirement for the second recording is much longer. By recording in this manner, the accuracy of the first recording flows through to the resulting rectangular panorama record. The initial recording occurs quickly due to known technology and the subsequent recording of the projected image to produce the conventional rectangular panorama record is time independent with respect to the recording of the actual panorama.

Figure 2:
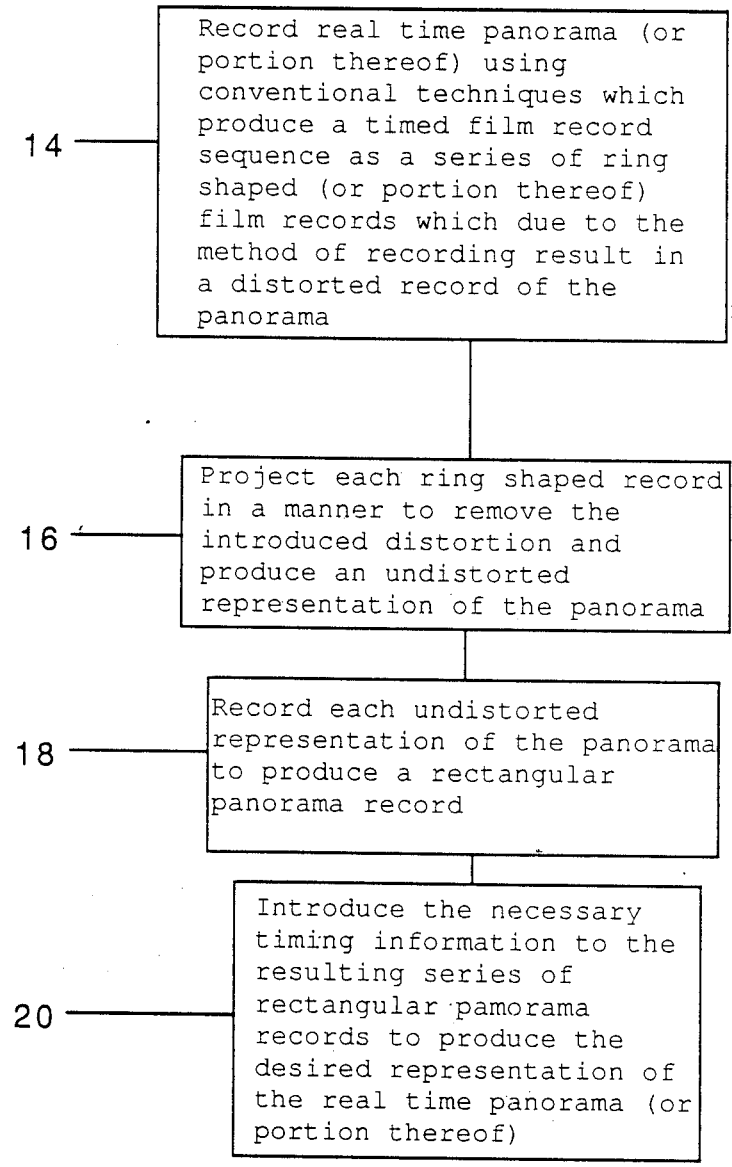
FIG. 2 is a flow chart showing the recording of a real time panorama.

The benefits of the method, generally set out in FIG. 1, can further be realized for the various steps set out in the real time recording of a panorama exemplified in FIG. 2. The flow chart of FIG. 2 still requires the recording 14 of the panorama in a distorted form, but in this case, a series of distorted records 48 are produced having a known timing interval. The second step 16 requires projection of each of these distorted records in a manner to remove the introduced distortion to produce an undistorted representation of the panorama. This undistorted representation of the panorama is then used for recording 18 of the representation of the panorama in a rectangular panorama record. The initial recording occurs in real time, whereas the projection and subsequent recording does not occur in real time. Thus, a very accurate, but distorted record is first obtained, followed by the projection of the record to remove the distortion and the subsequent recording of the representation in a rectangular panorama record. To complete the method, it is necessary to introduce the required timing information by step 20 to result in the series of rectangular panorama records producing the desired representation of the real time panorama. As can be appreciated, there is timing information associated with the initial recording and this can be introduced into the sequencing of the series of rectangular panorama records once they have been recorded.

FIG. 3 illustrates various types of panoramic lenses 3 referred to as P-lenses, type A and type B. Both types of P-lenses operate satisfactorily and are preferrably used in the initial recording of the actual panorama.

FIG. 4 shows the recording of a panorama using a P-lens and a conventional camera. This will produce the ring shaped image 50 stored on film. This is a distorted record of the actual panorama and would be difficult for an individual to effectively use.

Each record 50 of the series of records 48 of FIG. 4 are used in the apparatus as generally shown in FIG. 5 for projecting of the record by means of the P-lens 25 to reproduce, in this case, the panorama on the cylindrical screen 26. Each record 50 of the series of records 48 is brought into registration with the projecting arrangement 56 comprising a light source 58 and a focusing lens 60. In this case, the series of records 48 is unwound from reel 62 and collected on reel 64. Camera 29 moves about track 31 a fixed radial distance from the panoramic lens 25. In this case, a film record 33 of a vertical segment of the panorama is produced which, in combination with the other records produced as the camera 29 sequentially moves about the panoramic lens, results in a rectangular record of the panorama.

As can be appreciated, whatever time is required to effect the accurate recording of the projected image is possible, as this step is not time dependent as the original record remains unchanging. Timing of the changing panorama image is introduced once all conversion of the original distorted records to the rectangular panorama record has been completed.

The method of recording the projected image need not use a cylindrical screen, as the recording can be made direct using a camera arrangement moved about the panoramic lens 25 or a CCD arrangement or other solid state recording device sequentially moved around the panoramic lens. If a solid state device is used, each recording position can be vertically scanned in a sequence of steps which collectively represent the vertical scanned portion. Thus, the actual record format for recording of the projected image or for recording of the initial image can vary as long as the desired accuracy of the final recording is satisfactory. High resolution film for the initial recording is the most desirable today, although improvements in solid state recording may make it preferred in the future. Direct recording of the projected image rather than recording from a screen may also improve accuracy.

FIG. 6 shows a preferred form of the rectangular panorama record 70 produced by the apparatus of FIG. 5. In this case, the first 0° to 180° 72 of the panorama are stored in an upper part of the record and portion 180° to 360° 74 are recorded in the lower part of the record resulting in the equal segments being stacked one atop the other in the buffer. This results in an approximate overall 3:5 image ratio (when the vertical scan is about 55°) which is easily stored using existing storage devices and existing buffers suitable for High Definition television. Such buffers or storage devices have sufficient capacity to permit only portions of the image to be displayed with good resolution. This is necessary, as typically only a portion of the panoramic record is being scanned at any point in time. This type of ratio is preferred, but other arrangements are possible for dividing the recorded panorama suitable for storage in common buffers having an overall image ratio of 3:5. The exact storage arrangement will vary depending upon the number of degrees in the vertical direction scanned. Different buffer arrangements can be designed based on particulars of the panorama recorded and the requirements of the overall system.

FIG. 7 shows the second stage of the method which is essentially time independent. It includes the projection 80 of the film record to produce an actual projection representation of the recorded panorama, which could be viewed on a cylindrical screen, and this projected representation is then rerecorded using a rotating optical slit scanner for producing a film record (step 82) or a rotating optical slit scanner in combination with a CCD device (step 84). After the rectangular records have been produced and the necessary timing information reintroduced into the resulting series, the record can be accessed using conventional technology such as a high density T.V., VCR 86, or optical disc player, depending upon the type of format used, in combination with a frame buffer 90 and various control arrangements for selecting which portion of the actual record the viewer wishes to consider. Such variation can be imparted to the system by the joystick control 92 or the use of the video glasses 99 which are responsive to the head movement of the user, as but two examples. The selected portion of the panorama is displayed on video display device 106.

The recording of the projected representation has been described on the basis that the projected representation is stationary and the recording arrangement moves. It is possible to sequentially rotate the projected representation and have the recording arrangement stationary.

Figure 8:
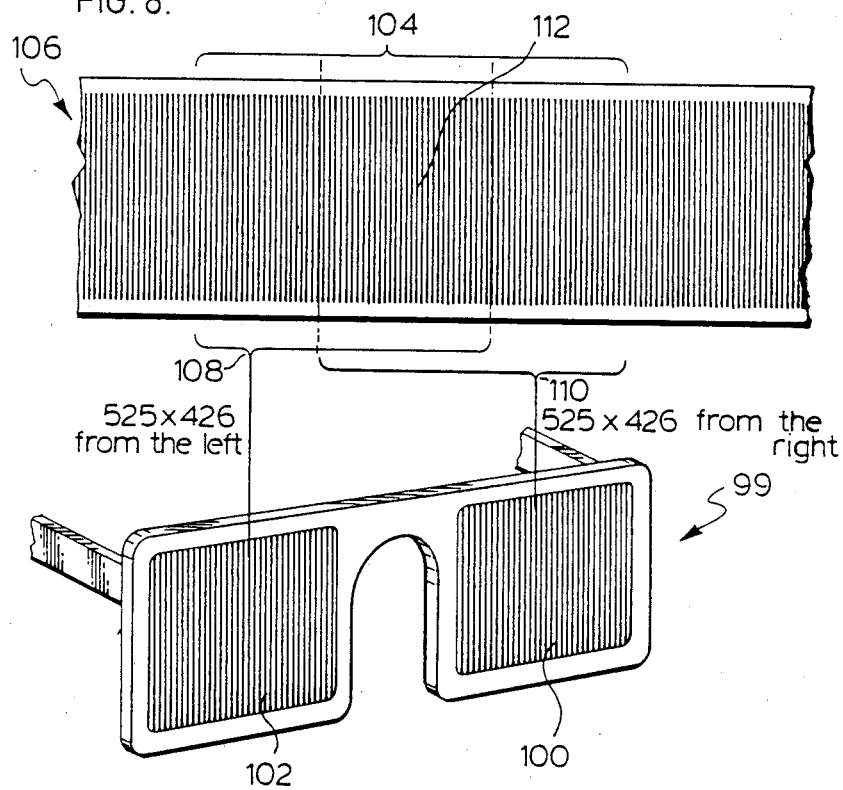
FIG. 8 is schematic of a portion of a rectangular panoramic record being sampled for display on video glasses associated therewith.
Figure 9:
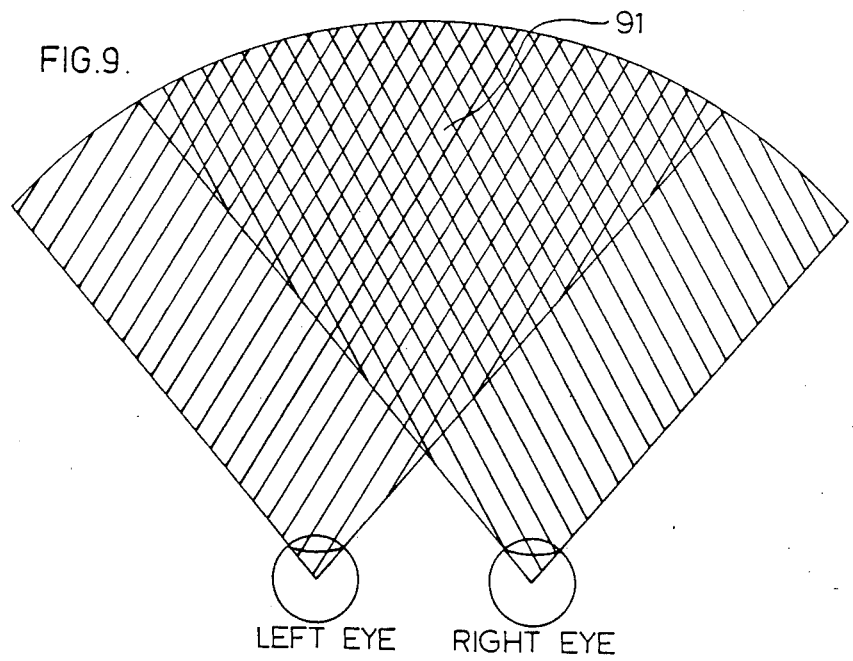
FIG. 9 is a schematic of the field of view of two eyes.

An enhancement to the viewing of the series of rectangular panoramic records, either by this method or any other method, can be accomplished by processing the signal to produce a synthetic parallax effect similar to the parallax effect used by human eyes. As shown in FIG. 8, the video glasses 99 have two screens 100 and 102 for viewing of a particular portion of the record. Human eyes, as shown in FIG. 9, have an overlapped field of view indicated by the crosshatching 91 of FIG. 9. To reproduce this effect, a portion 104 of the overall panoramic record 106 being sampled is used for each of the viewing screens 100 and 102. One of the viewing screens would only look at a limited portion of 104, indicated by the bracketed area 108. The opposite viewing screen would receive the signal resulting from the bracketed portion 110. This results in an overlapped area of the portion 104 of the record, indicated by 112, and thus, synthetically produces an effect similar to the overlap illustrated in FIG. 9. In order to produce this, computer software merely selects the appropriate portion of the record to be displayed with respect to each of the video screens 100 and 102, in accordance with the principles set out above.

Figure 11:
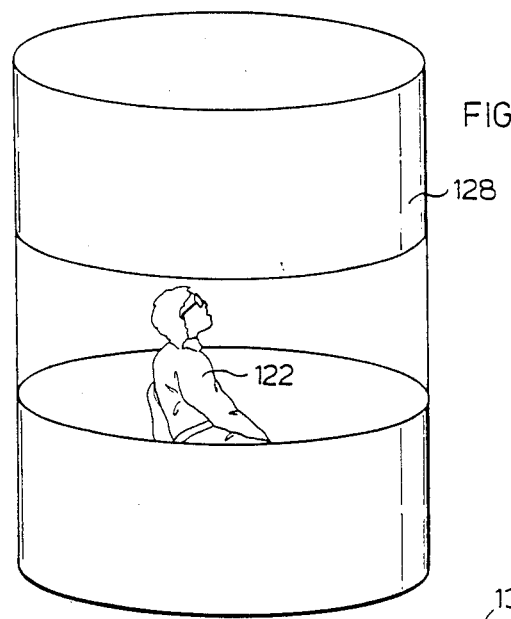
FIG. 11 is a representation of various fields of view of a user.

A further enhancement of the viewing of these types of records is illustrated in FIGS. 10 and 11. FIG. 10 illustrates a particular field of view 120 of the user 122 provided with the video glasses 99. As long as the user does not tilt his head from side to side, the horizon in each of the viewing screens will remain horizontal FIG. 10b. However, if he tilts his head from side to side, this will result in an artificial tilt of the horizon which is an effect which would not be experienced if the user merely tilted his head in actual life. To overcome this deficiency, the video glasses 99 can include separate means 125 for maintaining the represented horizons of the image horizontal, as illustrated in embodiments of FIGS. 10a, b and c. The glasses can be provided with their own motorized arrangement 125 for effecting this sympathetic movement of the screens to correspond with actual reality, or computer software can be used and the angle of the glasses sensed with the resulting view to be displayed merely shifted according to this sensed angle. In the mechanical arrangement of FIGS. 10a, 10b and 10c, the viewing screens are mounted for rotation in a circle mount 126 having drives 125 provided at either side of the glasses.

Figure 11A:
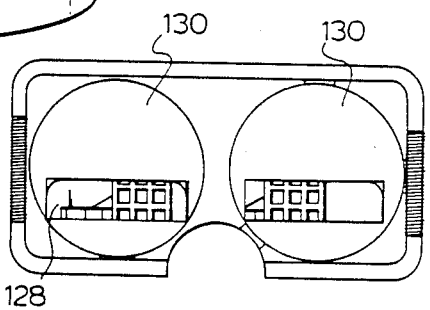
FIGS. 11a, 11b and 11c show certain displays on the screens of the video glasses under different actions of the user.
Figure 11B:
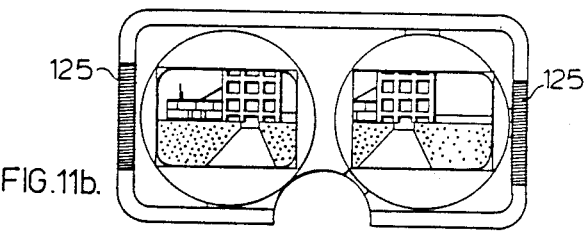
Figure 11C:
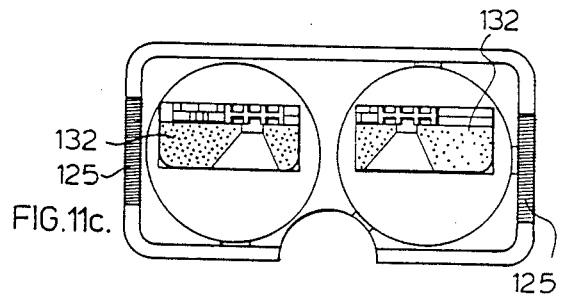

A further enhancement is shown in FIG. 11. In this case, as the user 122 tilts his head back to view the higher part of the image 128, a reduced field of view is seen and the portion of the screen 130 outside of this image viewing area is blacked out, as illustrated in FIG. 11a. FIG. 11b illustrates when the viewer's head is horizontal. FIG. 11c shows a view 132 of the lower part of the field. The portion of the viewing screen which is not in use is blacked out to increase the realistic effect.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A method for accurately recording an image of at least 180°, comprising:
    at least a two stage method,
    said first stage comprising:
       recording a panorama of at least 180° in a manner not suitable for video, said second stage comprising:
       projecting the recorded image in a manner suitable for display on a cylindrical screen and recording the projected image in a manner suitable for reproducing selected portions of the recorded projected image on a video display device.

2. A method as claimed in claim 1, wherein said first stage records the panorama at least 180° in a distorted form and the second stage step of projecting the recorded image reverses the distortion.

3. A method as claimed in claim 1, wherein said recording step of said first stage includes using a panoramic lens to gather the image for recording.

4. A method as claimed in claim 3, wherein said projecting step includes the use of a panoramic lens.

5. A method as claimed in claim 4, wherein said method is used for recording a real time changing panorama, and
    said first stage steps accurately record the changing panorama in a series of records and said second stage steps which require more time to complete utilize the series of records for converting the series into a form suitable display on a video display device.

6. A method as claimed in claim 4, wherein said second stage uses a rotating optical slit scanner.

7. A method as claimed in claim 4, wherein said second stage records the panoramic image in a rectangular panoramic record.

8. A method as claimed in claim 7, wherein said rectangular panoramic record is stored in a frame buffer.

9. A method as claimed in claim 8, wherein said rectangular panoramic record is stored in said frame buffer as two equal image sections stacked one atop of the other.

10. A method of recording a panoramic image of up to 360° comprising:
    gathering such panoramic image by means of a panoramic lens and recording of the gathered panoramic image in a ring like format;
    projecting the recorded panoramic image by means of a panoramic lens to produce an image which represents the panoramic image when viewed on a cylindrical screen;
    sequentially recording the projected image in series format such that a selected portion of the series may be used for displaying the selected portion on a video display device.

11. A method as claimed in claim 10 for recording a real time panoramic image wherein said step of gathering and recording is repeated in a known time sequence to produce a series of recordings, and
    said step of projecting is carried out as a separate operation not bound by the timing restraints of the gathering and recording step, such that the sequential recording of each recording of the series is carried out independent of time restraints of the gathering and recording step, and
    introducing the appropriate timing intervals into the resulting string of series formats.

12. A method of recording a real time panoramic image sequence comprising a first and second stage, the first stage comprising:
    gathering such panoramic image sequence by means of a panoramic lens and recording the gathered panoramic image sequence by a sequence of film records, each of which accurately records one panoramic image of the panoramic image sequence, and the second stage comprises:
    projecting each film record by means of a panoramic lens such that the recorded panoramic image could be reproduced on a cylindrical screen thereabout and incrementally recording the projected image with an accuracy corresponding to the film records.

13. In a method for recording a panoramic image comprising the steps of:
    first recording the panoramic image in a distorted format to provide a projectable record of the panoramic image, said step of first recording requiring a short duration of time, and subsequently
    projecting the projectable record in a manner to reverse the distortion of the distorted format, and
    recording the projected record in a series of records which are capable of accurately reproducing selected portions of the projected record on a video display device, wherein
    said step of recording the projected record in a series of records being completed in a time duration many times the short duration of time required for the first recording of the panoramic image.

14. A combination for recording a panoramic image, comprising:
    a panoramic lens to scan a panorama and first recording means associated with said panoramic lens to record the image of the panorama on a recording media in a distorted form,
    means for projecting the recorded image by means of at least a corresponding panoramic lens to remove the distortion, and means for sequentially recording the projected image in a rectangular panoramic record suitable for video display.

15. A combination for accurately recording a real time panoramic image, comprising:
   image gathering means including a panoramic lens to continuously view a panorama and a film recording means associated therewith for sequentially recording the image of the panorama on a film recording media in a distorted format in a known time sequence,
   means for projecting the image of the panorama recorded on the recording media by means of a panoramic lens in a manner to remove distortion, and
   second recording means for sequentially recording the projected image in a manner suitable for video including means for introducing the proper time sequence based on the known time sequence such that the recorded projected image corresponds with the timing of the real time panoramic image,
   said second recording means not being suitable for recording a changing panorama which can be accurately recorded by said first recording means.

16. In a method for recording a real time panoramic image which changes in time for selective display on a video display device, the combination comprising:
   first recording means to record the panoramic image in a manner which distorts the panoramic image to the human eye including a sequence of film records having a known time duration therebetween such that each record corresponds to the panoramic image at a single point in time, and
   means for projecting each film record in a manner to produce an undistorted image corresponding to the original panoramic image and second recording means for recording each projected film record in a manner suitable for display on a video display device, wherein the second recording means requires a time duration for recording of the undistorted image many times the known time duration between film records.

17. A combination for recording a panoramic image of up to 360° comprising:
   means for gathering and recording such panoramic image in a ring like record, said means for gathering and recording including
   a panoramic lens;
   a projecting arrangement for projecting the recorded panoramic image including a panoramic lens to produce an image which represents the panoramic image when viewed on a cylindrical screen; and
   recording means to sequentially record the projected image in series format such that a selected portion of the series may be used for displaying the selected portion on a video display device.

* * * * *